United States Patent [19]
Curtis

[11] 3,758,975
[45] Sept. 18, 1973

[54] SELF-PROPELLED BOBBER
[76] Inventor: George Curtis, Rt. 3, Box 749, Salem, Oreg. 97302
[22] Filed: May 24, 1972
[21] Appl. No.: 256,549

[52] U.S. Cl. .............................................. 43/26.1
[51] Int. Cl. ...................... A01k 85/06, A01k 93/00
[58] Field of Search ........................... 43/26.1, 26.2

[56] References Cited
UNITED STATES PATENTS
3,618,254  11/1971  Myers .................................. 43/26.1
3,203,131  8/1965  Myers .................................. 43/26.1

Primary Examiner—Louis G. Mancene
Assistant Examiner—Daniel J. Leach
Attorney—Hoppe, Slick, Mitchell & Anderson Eckhoff

[57] ABSTRACT

A self-propelled bobber for trolling a fishing line having a float, propulsion means for propelling the float, a steering rudder, and means for remotely setting the steering rudder at an angle to the direction of propulsion, thereby causing the bobber to troll in a circle.

2 Claims, 4 Drawing Figures

PATENTED SEP 18 1973 3,758,975
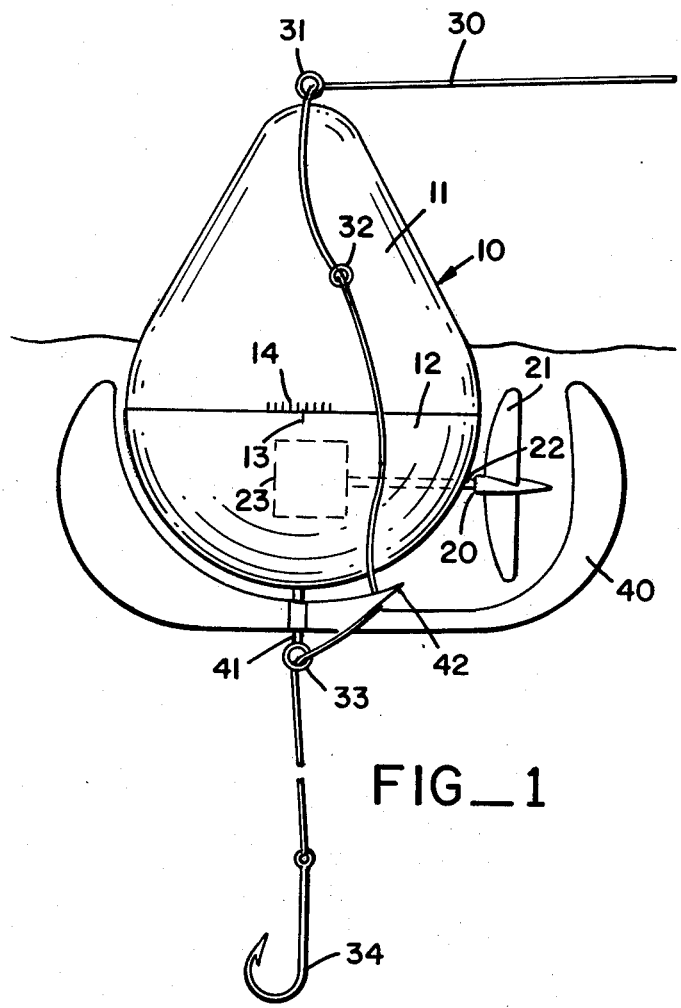
FIG_1
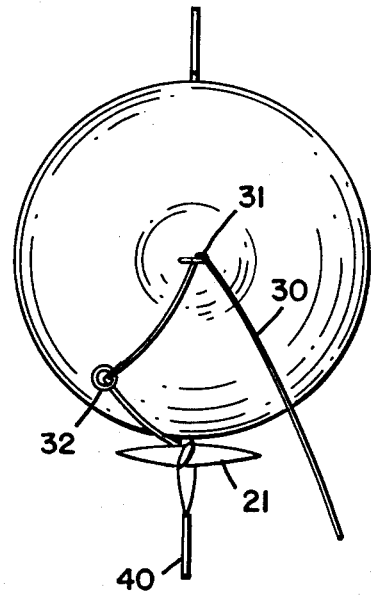
FIG_2
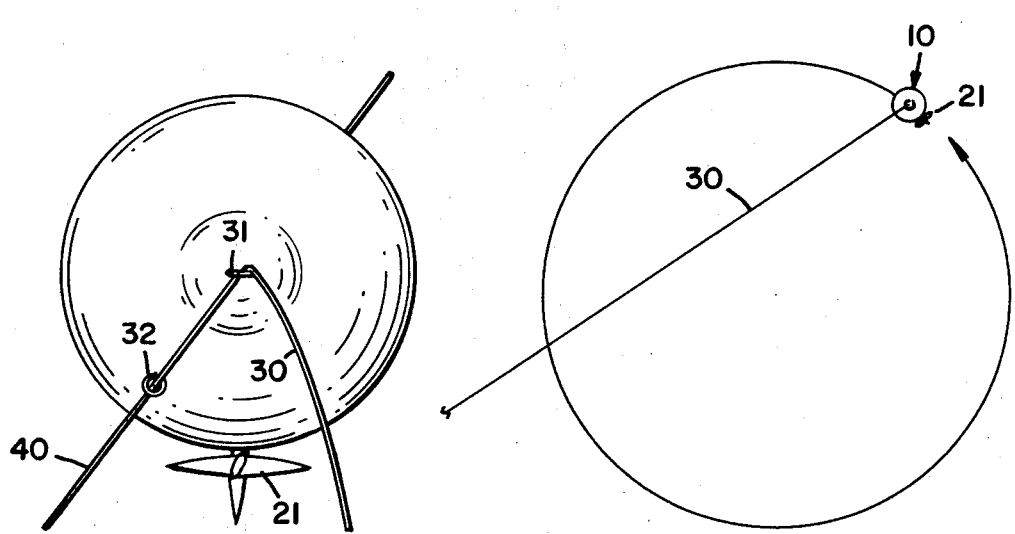
FIG_3
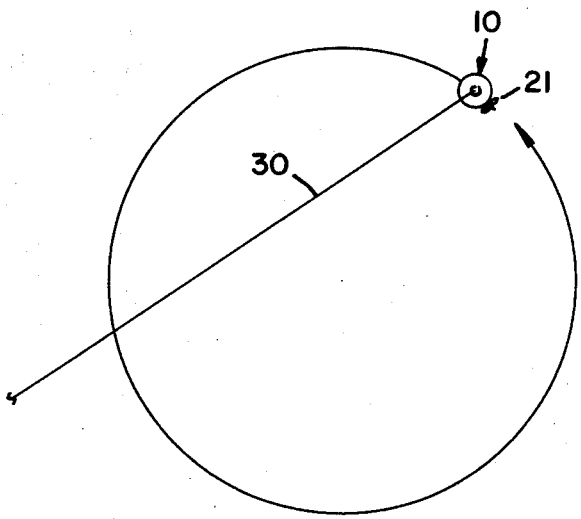
FIG_4

SELF-PROPELLED BOBBER

This invention relates generally to fishing bobbers and more particularly to a self-propelled trolling bobber.

Trolling is a technique used in the sport of fishing whereby a line is dragged through the water and the moving bait is used to lure fish. This technique usually requires the use of a boat. The present invention enables a fisherman to troll in waters far from shore without using a boat.

It is a principle object of this invention to provide a self-propelled fishing bobber which may be controlled from the shore and which trolls in a circle of predetermined radius.

Another object of the invention is to provide a self-propelled bobber which enables the fisherman to guide his lure to a specific offshore target area.

A further object of the invention is to provide a very simple and economic self-propelled trolling bobber.

Other objects and advantages of the invention will become apparent from consideration of the following description of a preferred embodiment and the accompanying drawings wherein:

FIG. 1 is a side elevational view of the bobber as it is advancing through the water to a target area;

FIG. 2 is a top view of the bobber of FIG. 1;

FIG. 3 is a top view showing the position of the rudder as the bobber trolls in a circle; and FIG. 4 is a schematic representation showing the bobber trolling in a circle of predetermined radius.

The described embodiment includes a float 10 comprising a top portion 11 and a base 12. The base 12 carries propulsion means 20. The propulsion means 20 comprises a propeller 21 carried on a shaft 22 which extends through the surface of base 12. The interior of base 12 is hollow and carries a small battery powered DC motor 23 which rotates shaft 22 and propeller 21.

Fishing line 30 passes through a first eyelet 31 mounted on the top of float 10, a second eyelet 32 carried on the side of float 10, a third eyelet 33 on the center line of base 12, and then depends to connect to hook 34. Eyelet 32 is displaced from the straight line between eyelet 31 and propulsion means 20.

A pivotable steering rudder 40 is carried by vertical shaft 41 which extends downwardly at the center of base 12. Rudder 40 pivots about the axis of shaft 41. Rudder 40 has a notch 42 through which line 30 passes.

As shown in FIG. 1, line 30 is slack and rudder 40 is aligned with the direction of propulsion.

FIG. 2 is a top view of the bobber of FIG. 1 showing rudder 40 in alignment with the direction of propulsion. In the condition shown in FIGS. 1 and 2, the bobber may be placed in the water at the shoreline and pointed toward a target area. The bobber will travel in a straight line due to the alignment of the rudder 40 with the direction of propulsion.

When the bobber reaches the target area, it begins trolling in a circle when the fisherman pulls the fishing line taut, thereby activating means for remotely setting the steering rudder 40, said means comprising, in this embodiment, first eyelet 31, second eyelet 32, and notch 42 of rudder 40.

FIG. 3 shows the bobber after fishing line 30 has been pulled taut. Such manipulation of fishing line 30 displaces rudder 40 and sets it at an angle to the direction of propulsion, causing the bobber to travel in a circle as shown in FIG. 4. Referring to FIG. 1, it can be seen that when line 30 is pulled taut, frictional contact between line 30 and notch means 42 of rudder 40 which embraces the line brings rudder 40 into alignment with eyelets 31 and 32 (as shown in FIG. 3) thereby setting rudder 40 at an angle to the direction of propulsion. Notch 42 provides a means for connecting the fishing line to rudder 40.

The radius of the trolling circle may be predetermined by adjusting the displacement of top portion 11 of float 10 relative to the base 12. A mark 13 is carried by base 12 on its upper edge. A series of marks 14 is carried by upper portion 11 of float 10. Marks 14 may be calibrated in terms of the size of the trolling circle. The greater the relative displacement of top portion 11 with respect to base 12, the smaller the radius of the trolling circle.

The invention also contemplates the use of a one-piece float in which eyelet 32 is displaced from the line between eyelet 31 and propulsion shaft 20.

I claim:

1. A self-propelled bobber for trolling a fishing line comprising a float connected to the fishing line with its hooked end depending therefrom;

propulsion means carried on said float for propelling said float in a single direction;

a pivotable steering rudder on said float selectively set in alignment with or at an angle to the direction of propulsion;

means for remotely setting said steering rudder by manipulation of said fishing line comprising a first eyelet through which the fishing line passes mounted on the top of said float a second eyelet through which the fishing line passes mounted on the side of said float and displaced from the straight line between said first eyelet and said propulsion means and means for connecting the fishing line to said rudder such that by pulling the fishing line taut, said rudder is brought into alignment with said first and second eyelets.

2. The bobber of claim 1 wherein said float comprises a base which carries said propulsion means and a top portion which carries said first and second eyelets and which may be displaced relative to said base whereby the relative displacement of said top portion relative to said base causes said bobber to troll in a circle of predetermined radius.

* * * * *